March 25, 1958     H. F. NELSON     2,827,675
STAIR TREAD CONSTRUCTION
Filed May 21, 1954
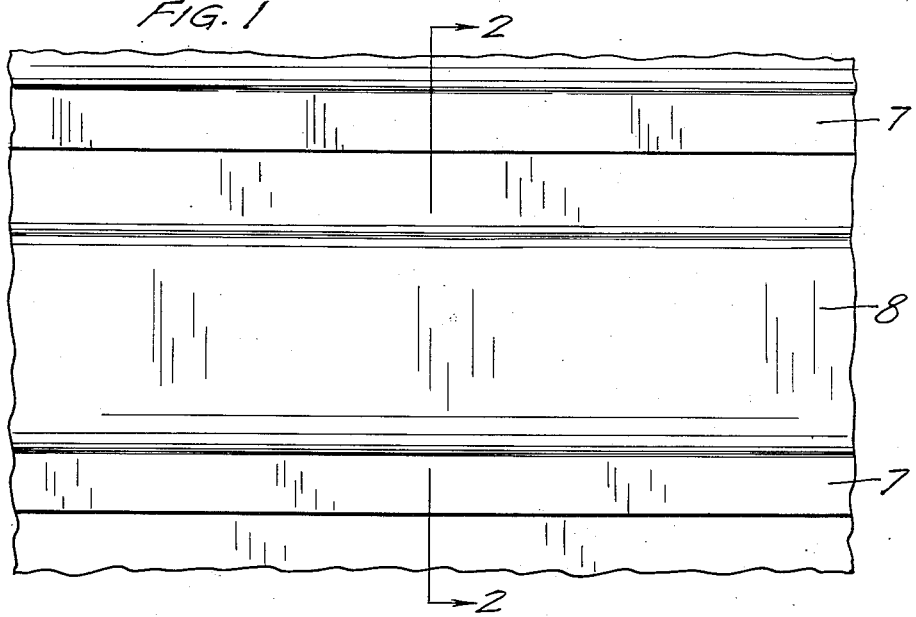
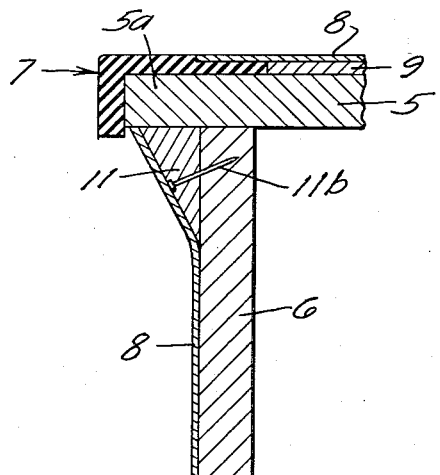
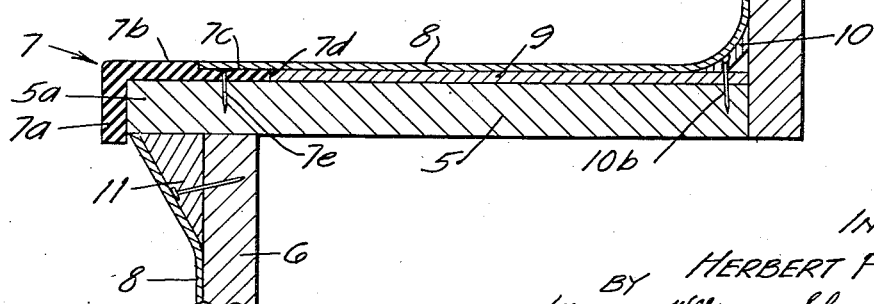
INVENTOR
HERBERT F. NELSON
BY Williamson, Williamson, Schroeder + Adams
ATTORNEYS

United States Patent Office 2,827,675
Patented Mar. 25, 1958

2,827,675

STAIR TREAD CONSTRUCTION

Herbert F. Nelson, Hopkins, Minn.

Application May 21, 1954, Serial No. 431,342

2 Claims. (Cl. 20—79)

This invention relates generally to a stair tread construction and particularly to a long-wearing stair tread having a relatively safe smooth top surface.

It has long been a problem to produce a safe and durable stair tread which could be easily manufactured and installed. Many of the treads which are relatively durable, being provided with metal edging and the like, are relatively unsafe and often cause accidents since they are relatively slippery and it is very easy to catch the heel of a shoe on the upwardly projected portion thereof, thus causing a fall. The protected wooden stairs often wear excessively and are difficult to maintain as well as being relatively slippery.

It is an object of my present invention to provide an extremely durable, easily cleaned stair tread construction which is capable of being easily and quickly installed on the surface of a conventional stair.

More specifically, it is an object to provide a stair tread structure having a durable, non-skid nosing piece having a recessed rear edge portion to receive in flush relation thereto a layer of protective sheet material such as linoleum, rubber tile or the like and having a lower edge portion extending upwardly over the front end of the tread member to provide a wedging abutment to retain the upper edge of the protective layer and positively wedge the same into tight engagement with the recess in the nosing member disposed on the tread below.

These and other objects and advantages of this invention will more fully appear from the following description made in connection with the accompanying drawings wherein like reference characters refer to the same or similar parts throughout the several views, and in which:

Fig. 1 is a fragmentary front elevational view of my tread construction; and

Fig. 2 is a vertical sectional view taken substantially along the line 2—2 of Fig. 1.

As illustrated in the accompanying drawings, I provide a conventional stair construction having a rigidly mounted tread member 5 with a conventional riser member 6 extending upwardly at the back thereof and, of course, the entire stair being made from a plurality of such tread and riser assemblies with the tread extending forwardly of the riser a substantial distance, as best shown in Fig. 2, to produce an overhang portion 5a along the front edge of each tread member.

To this conventional tread and riser assembly, I attach my new construction which combines therewith to produce a durable and extremely safe stair design.

Along the front edge of the tread member 5, I provide a pre-formed nosing piece made from rubber or other durable non-skid material and designated as an entirety by the numeral 7. The nosing 7 has a front flange 7a extending vertically downward along the front edge of the tread member 5 and has a horizontally disposed rearwardly extending flange member 7b. The rear longitudinal edge portion of flange 7b has a recess 7c formed therein to receive the lower front edge portion of a covering sheet or layer 8 made from any floor covering material such as linoleum or rubber tile.

A filler lamination 9 is interposed between the rear extreme edge 7d of the nosing member 7 and the front surface of the riser 6, and the thickness of the filler lamination 9 is exactly the same as the thickness of said nosing member at the rear edge thereof and said lamination 9 is stiff and flat to provide a smooth and uniform surface on which to lay the covering lamination 8 and cover any roughness or unevenness in the top surface of the tread member 5.

A cove strip 10 is provided at the rear corner of the step between the tread 5 and the riser 6 and an upwardly diverging wedge-shaped member 11 is mounted at the top of each riser 6 adjacent the overhanging portion 5a of each tread 5 to provide positive support to the outer marginal edge portion of the tread 5 and also produce a downwardly beveled surface at the top of each riser. The covering lamination 8 is then securely wedged between the front edge portion of tread covering 5a and the abutment stop formed in nosing member 7 at the front edge of recess 7c.

This stair tread assembly can be installed on either new or used stair tread constructions, and the following is a description of the proper installation thereof. The nosing piece 7 is initially glued by any suitable rubber type cement or the like to the front edge portion of the stair tread 5. In addition to the adhesive, a plurality of attachment tacks 7e may be provided to insure proper anchoring of the rear portion of said nosing member. In the event that the diminished portion of the nosing member 7 disposed rearwardly of the front covering abutment does not extend to the full width of the stair tread, the filler lamination 9 must be installed by being secured to the top tread surface as by a suitable adhesive to maintain a flat surface behind said nosing piece and provide a smooth uniform surface on which the covering sheet 8 may be secured. After the filler lamination 9 has been secured in place, the cove strip 10 and beveled wedge member 11 may be securely anchored in place by any suitable means such as the nails 10b and 11b respectively. The final step in the installation of this unit is the securing of the covering lamination 8 behind the abutment formed at the front edge of recess 7c and nosing 7 and extending said lamination 8 rearwardly to cove 10 and thence upwardly into engagement with the bottom marginal edge portion of the overhanging tread portion 5a. Suitable adhesive such as linoleum cement may be used to securely anchor the covering lamination to the supporting surface.

It will be seen that I have provided a relatively simple, yet highly efficient and durable stair tread construction capable of being easily and quickly installed on either new stair construction or on presently existing construction and which will provide a smooth and unobstructed top supporting surface with a non-skid nosing member recessed at the rear portion thereof to receive a covering lamination such as linoleum or the like. It should be noted that this construction permits the use of extremely inexpensive and relatively roughly fitted tread and riser material while still providing a covering which not only covers the tread portion of the stair but also continues around the cove and up the front surface of the riser to provide a long wearing, extremely attractive and easily cleaned stair unit.

It will, of course, be understood that various changes may be made in the form, details, arrangement and proportions of the parts without departing from the scope of this invention which, generally stated, consists in the matter shown and described herein and set forth in the appended claims.

What I claim is:

1. A stair tread assembly comprising a tread member, a nosing member secured to the front portion of said tread member and including a front vertical flange element securely anchored against the front edge of the tread member and also including a horizontally disposed rear flange element securely anchored to the front marginal portion of said tread member and provided with a diminished rear marginal edge portion to form a covering receiving recess with an abutment edge along the front extremity of said recess, a cove member mounted at the rear of said tread member, a stiff flat filler lamination interposed between the rear edge of the diminished portion of the nosing and of the same thickness therewith an upstanding riser member extending upwardly from said cove member, and a covering lamination secured to the top surface of said diminished recess portion and said filler lamination with the front edge thereof engaged with the abutment edge of said recess and extending rearwardly therefrom to engage said cove member and be securely anchored to said riser and said cove member.

2. The structure set forth in claim 1, and a beveled wedge member fixed to the top of said riser member, said tread member overhanging said riser member with the overhung portion being supported by said wedge member, and said covering lamination extending upwardly to engage the bottom of said overhung tread member at its upper edge and being securely anchored to the front surface of said wedge member and said riser member.

References Cited in the file of this patent

UNITED STATES PATENTS

| | | |
|---|---|---|
| 607,457 | Rasmussen | July 19, 1898 |
| 718,821 | Cooper | Jan. 20, 1903 |
| 1,739,077 | Lisher et al. | Dec. 10, 1929 |
| 1,789,875 | Loudenslager | Jan. 20, 1931 |
| 1,936,224 | Awbrey | Nov. 21, 1933 |
| 2,458,293 | Neumann | Jan. 4, 1949 |